United States Patent [19]
Takeda et al.

[11] Patent Number: 5,912,750
[45] Date of Patent: Jun. 15, 1999

[54] OPTICAL TRANSMISSION LINE

[75] Inventors: Noriyuki Takeda, Tokyo; Takayuki Miyakawa; Hidenori Taga, both of Saitamaken; Shigeyuki Akiba, Tokyo; Shu Yamamoto, Saitamaken, all of Japan

[73] Assignee: Kokusai Denshin Denwa Kabushiki-Kaisha, Japan

[21] Appl. No.: 08/779,780

[22] Filed: Jan. 7, 1997

[30] Foreign Application Priority Data

Jan. 9, 1996 [JP] Japan ................. 8-001646

[51] Int. Cl.$^6$ ........................................... H04J 14/02
[52] U.S. Cl. .................... 359/124; 359/154; 359/161; 359/173; 359/341
[58] Field of Search ........................... 359/124, 154, 359/161, 173, 341

[56] References Cited

U.S. PATENT DOCUMENTS

| | | | |
|---|---|---|---|
| 5,050,949 | 9/1991 | DiGiovanni et al. | 359/341 |
| 5,117,196 | 5/1992 | Epworth et al. | 359/333 |
| 5,239,607 | 8/1993 | da Silva et al. | 359/341 X |
| 5,260,823 | 11/1993 | Payne et al. | 359/341 |
| 5,357,364 | 10/1994 | Gordon et al. | 359/173 |
| 5,436,760 | 7/1995 | Nakabayashi | 359/341 |
| 5,706,125 | 1/1998 | Nakano | 359/341 |

OTHER PUBLICATIONS

*IEEE Photonics Technology Letters*, vol. 3, No. 8, pp. 718–720, "Tunable Gain Equalization Using a Mach–Zehnder Optical Filter in MultistageFiber Amplifiers", Aug. 1991, Inoue, et al.

OFC'95, *Technical Digest*, TuPl, 1995, pp. 77–78, "Gain–Flattened Optical–Fiber Amplifiers with a Hybrid Er–doped–fiber configuration for WDM Transmission", Kashiwada, et al.

*Primary Examiner*—Thomas Mullen
*Attorney, Agent, or Firm*—Banner & Witcoff, Ltd.

[57] ABSTRACT

Wavelength multiplexed optical signals which are input into a first optical amplifier from an optical transmission terminal device over an optical fiber are differently amplified in respective wavelengths due to unevenness of gain of the optical amplifiers and then output. By providing M-transmission optical filters having an M-type transmission characteristic to cancel gain deviation of the optical amplifiers in respective wavelengths, a flat gain characteristic can be achieved even after the optical signals are transmitted via a plurality of optical amplifiers and a plurality of M-transmission optical filters. Also, by removing ASE in a wavelength range of 1.53 $\mu$m which prevents signal amplification in a wavelength range of 1.55 $\mu$m, the wavelength multiplexed optical signals which are sufficiently amplified can be transmitted to an optical reception terminal device over the optical fiber.

4 Claims, 11 Drawing Sheets

(120km, THREE AMPLIFIERS)

(1000km, TWENTY-SEVEN AMPLIFIERS)

(6000km, A HUNDRED AND FIFTY AMPLIFIERS)

5,912,750

OPTICAL TRANSMISSION LINE

BACKGROUND OF THE INVENTION

1. Field of the Invention

The present invention relates to an optical transmission line in which a plurality of optical amplifiers are connected in series with optical fibers at a predetermined distance to amplify a wavelength multiplexed optical signal transmitted over the optical fibers in conformity with a wavelength multiplexing communication system. More particularly, the present invention relates to an optical transmission line constructed to compensate for wavelength-dependent gain characteristics of the plurality of optical amplifiers using an erbium-doped optical fiber as gain medium and to optimally equalize an overall gain of the optical amplifiers.

2. Description of the Prior Art

As an optical amplifier to amplify a wavelength multiplexed optical signal transmitted over an optical fiber in conformity with the wavelength multiplexing communication system, an erbium-doped optical fiber amplifier (abbreviated as an "EDF amplifier" hereinafter) has been used. Although the EDF amplifier may achieve such an advantage that it can amplify optical signals in multiple channels simultaneously without mutual interference, it is difficult for the ordinary EDF amplifier to achieve flat gain of the optical signal throughout a wide wavelength range. In other words, if the EDF amplifier is used in the wavelength multiplexing communication system, a wide and flat gain bandwidth is required of the EDF amplifier. However, since it is difficult for the EDF amplifier to attain completely flat gain over the wide wavelength range, significant unevenness of gain is caused if such EDF amplifiers are connected to optical transmission lines consisting of optical fibers in a multistage fashion. In order to compensate for such unevenness in the gain characteristic of the EDF amplifiers, various approaches have been proposed in the prior art.

FIG. 1 is a view showing a configuration of a Mach-Zehnder variable-wavelength filter (referred to as an "MZ type variable-wavelength filter" hereinafter) to equalize gain of the EDF amplifiers by compensating for unevenness of gain of the EDF amplifiers. The MZ type variable-wavelength filter is so constructed that a heater 97 is attached to one of two waveguides 91, 92 having different lengths, two waveguides 91, 92 are sandwiched by two tunable couplers 93, 94, and heaters 95, 96 constituting a phase shifter are provided to one of two waveguides 91, 92. (See Kyo Inoue, Toshimi Kominato, and Hiromu Toba, "Tunable Gain Equalization Using a Mach-Zehnder Optical Filter in Multistage Fiber Amplifier", IEEE Photonics Technology Letters, Vol. 3, No. 8, pp. 718–720, August 1991.)

The MZ type variable-wavelength filter constructed as above has a sinewave function type transmission characteristic having a period which is determined according to difference in lengths of two waveguides 91, 92. A center frequency of the transmission characteristic can be shifted by the phase shifter constructed by the heater 97. Still further, an extinction ratio of the transmission characteristic can be varied by the phase shifter consisting of the heaters 95, 96. Therefore, as shown in FIGS. 2A to 2C, the transmission characteristic in a certain wavelength range can be varied optimally. Therefore, if the transmission characteristic of the MZ type variable-wavelength filter is designed to have equal gain of the wavelength multiplexed optical signal in respective wavelengths and then the MZ type variable-wavelength filter is connected to the output side of the optical amplifier, gain of the optical amplifier can be equalized.

In the meanwhile, an erbium-doped optical fiber in which aluminum (Al) as well as erbium are co-doped is used in the ordinary EDF amplifier. In this case, if the wavelength multiplexed optical signal is amplified by the EDF amplifier, the optical signal has an output optical spectrum characteristic, as shown in FIG. 3A. Optical power of the wavelength multiplexed optical signal in respective wavelengths increases upward to the right in an appropriate wavelength range. The characteristic in FIG. 3A shows a case where four wavelength multiplexed optical signals are transmitted at their full input power of −15 dBm.

In contrast, if the wavelength multiplexed optical signal is amplified by the EDF amplifier composed of an erbium-doped optical fiber in which phosphorus (P) and aluminum (Al) as well as erbium are co-doped, optical power of the wavelength multiplexed optical signal in respective wavelengths decreases downward to the right in an appropriate wavelength range.

Accordingly, as shown in FIG. 4, if a hybrid EDF amplifier is so constructed that the erbium-doped optical fiber 97 in which aluminum (Al) as well as erbium is co-doped and the erbium-doped optical fiber 98 in which phosphorus (P) and aluminum (Al) as well as erbium are co-doped are connected serially and then an output laser beam emitted from a pump laser diode module 100 is introduced into both optical fibers 97 and 98 via a WDM coupler 99 to excite them, the right-upward characteristic of the optical fiber 97 and the right-downward characteristic of the optical fiber 98 can be canceled mutually. As a result, as shown in FIG. 3C, the output optical spectrum characteristic of the hybrid EDF amplifier becomes flat, thus equalizing gain throughout the wavelengths. (See T. Kashiwada, M. Shigematu, M. Onishi and M. Nishimura, "Gain-Flattened Optical-Fiber Amplifiers with a Hybrid Er-doped-Fiber Configuration for WDM Transmission", OFC'95, TuP1, 1995.)

As mentioned above, in the conventional approach in which gain of the optical amplifier can be equalized by connecting the MZ type variable-wavelength filter to the output side of the optical amplifier, there are problems that the optical filter is complicated in structure so that the device is increased in size and the cost of production is also increased.

In addition, in the conventional approach in which the hybrid EDF amplifier is constructed by connecting the erbium-doped optical fiber in which aluminum (Al) as well as erbium is co-doped and the erbium-doped optical fiber in which phosphorus (P) and aluminum (Al) as well as erbium are co-doped are connected in series with each other, there are problems that, when the hybrid EDF amplifiers are connected in a multistage fashion, ASE (amplified spontaneous emission) in a 1.53 μm wavelength range is increased so that gain in a signal wavelength range of 1.55 μm cannot be achieved.

FIGS. 5A to 5C are characteristic diagrams in which ASE of a light signal supplied from the EDF amplifier using the erbium-doped optical fiber in which phosphorus (P) as well as erbium is co-doped to increase ASE in the 1.53 μm wavelength range is plotted as a function of wavelength. FIG. 5A shows ASE characteristic obtained in the event that three EDF amplifiers using the erbium-doped optical fiber in which phosphorus (P) together with erbium is co-doped are connected and the optical signal is transmitted by a transmission distance of 120 km. FIG. 5B shows ASE characteristic obtained in the event that twenty-seven EDF amplifiers are connected and the optical signal is transmitted by a transmission distance of 1000 km. FIG. 5C shows ASE characteristic obtained in the event that a hundred and fifty EDF amplifiers are connected and the optical signal is transmitted by a transmission distance of 6000 km.

From the ASE characteristics shown in FIGS. 5A to 5C, it can be appreciated that, if the more EDF amplifiers using the erbium-doped optical fiber in which phosphorus (P) as well as erbium is co-doped that are connected in a multistage fashion, the more ASE in the 1.53 μm wavelength range has been increased, whereby gain of the signal in the wavelength range of 1.55 μm has not been able to be obtained.

SUMMARY OF THE INVENTION

The present invention has been made in the light of above circumstance, and it is an object of the present invention to provide an optical transmission line in which such optical fibers are connected in series with optical amplifiers that have an M-character-shaped transmission characteristic to equalize a gain of a wavelength multiplexed light signal transmitted over the optical fibers in conformity with the wavelength multiplexing communication system.

In order to achieve the above object, according to the present invention, there is provided an optical transmission line in which a plurality of optical amplifiers are connected in series with optical fibers at a predetermined distance to amplify wavelength multiplexed optical signals transmitted over the optical fibers in conformity with the wavelength multiplexing communication system, the optical transmission line comprising M-transmission optical filters which are connected in series with the plurality of optical amplifiers and have an M-character-shaped transmission characteristic to compensate for unevenness of gain of the plurality of optical amplifiers, and wherein dependence of an overall gain of the plurality of optical amplifiers on wavelength is optimally equalized.

In the present invention, the M-transmission optical filters having an M-character-shaped transmission characteristic are connected in series with a plurality of optical amplifiers to compensate for unevenness of gain of a plurality of optical amplifiers, thus optimally equalizing an overall gain of a plurality of optical amplifiers.

In a preferred embodiment of the present invention, each of the plurality of optical amplifiers or each group having at least two optical amplifiers connected in series has one M-transmission optical filter connected thereafter.

In this embodiment, in order to optimally equalize the overall gain of the plurality of optical amplifiers, each of the plurality of optical amplifiers or each group having at least two optical amplifiers connected in series has one M-transmission optical filter connected thereafter.

In another preferred embodiment of the present invention, the M-transmission optical filters have such a transmission characteristic that transmittivity assumes maximal values (peaks) at a first wavelength and a second wavelength, the transmittivity decreases significantly in a wavelength range which is shorter than the first wavelength as wavelength becomes shorter, the transmittivity decreases linearly in a wavelength range which is longer than the first wavelength and shorter than a third wavelength located between the first wavelength and the second wavelength as the wavelength becomes longer, the transmittivity increases linearly in a wavelength range which is longer than the third wavelength and shorter than the second wavelength as the wavelength becomes longer, and the transmittivity decreases significantly in a wavelength range which is longer than the second wavelength as the wavelength becomes longer.

In this embodiment, by providing the M-character-shaped transmission characteristic in which transmittivity assumes maximal values (peaks) at the first wavelength and the second wavelength to the M-transmission optical filters, unevenness of gain of the optical amplifiers can be compensated and further the transmittivity decreases significantly in the wavelength range which is shorter than the first wavelength as the wavelength becomes shorter, thus removing amplified spontaneous emission (ASE) in a wavelength range of 1.53 μm, for example.

In still another preferred embodiment of the present invention, the plurality of optical amplifiers are erbium-doped optical fiber amplifiers in a wavelength range of 1.55 μm, and the M-transmission optical filters have an inverse transmission characteristic in a central range to compensate for the gain characteristic of the plurality of optical amplifiers and have transmission characteristics capable of removing amplified spontaneous emission (ASE) in a wavelength range of about 1.53 μm.

In this embodiment, the M-transmission optical filters have an inverse transmission characteristic in a central range to compensate for the gain characteristic of erbium-doped optical fiber amplifiers in the wavelength range of 1.55 μm and also to remove amplified spontaneous emission (ASE) in the wavelength range of about 1.53 μm.

The nature, principle and utility of the invention will become more apparent from the following detailed description when read in conjunction with the accompanying drawings.

DESCRIPTION OF THE PREFERRED EMBODIMENTS

Preferred embodiments of the present invention will be explained with reference to the accompanying drawings hereinbelow.

Figure 1:
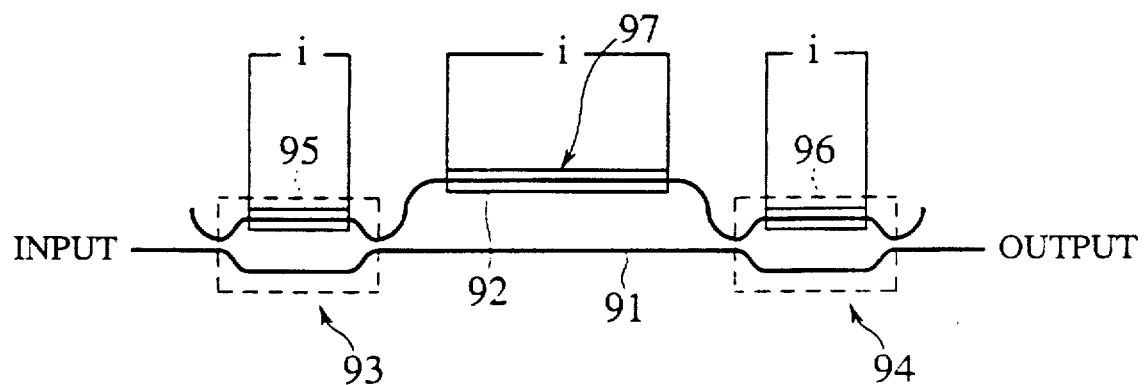
FIG. 1 is a view showing a configuration of a conventional MZ type variable-wavelength filter to equalize gain of an EDF amplifier.
Figure 2A:
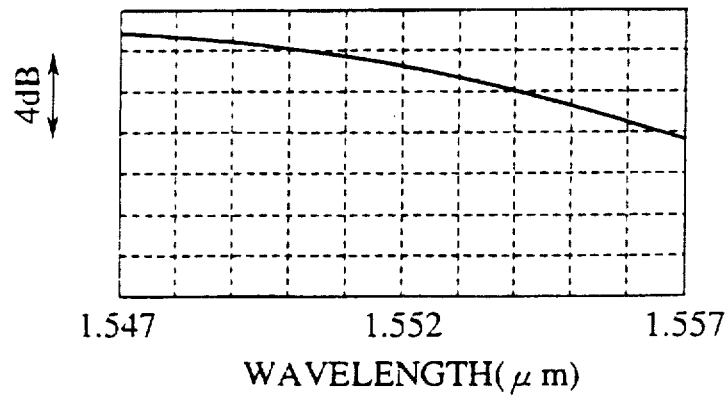
FIGS. 2A to 2C are graphs illustrating respectively transmission characteristics in a certain wavelength of the MZ type variable-wavelength filter shown in FIG. 1.
Figure 2B:
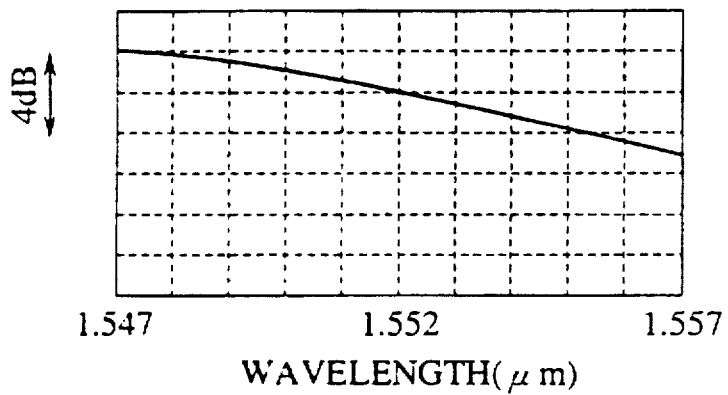
Figure 2C:
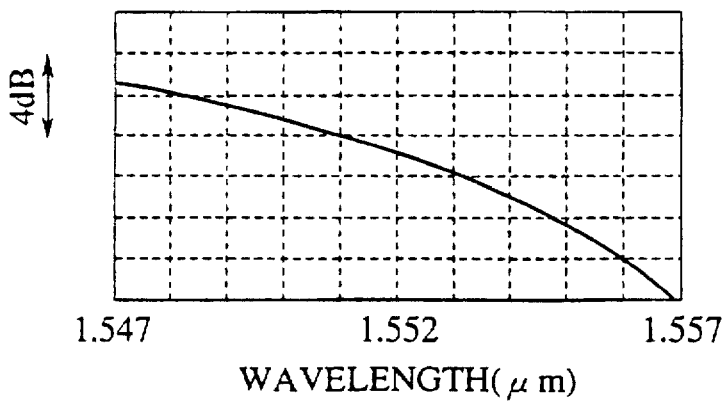
Figure 3A:
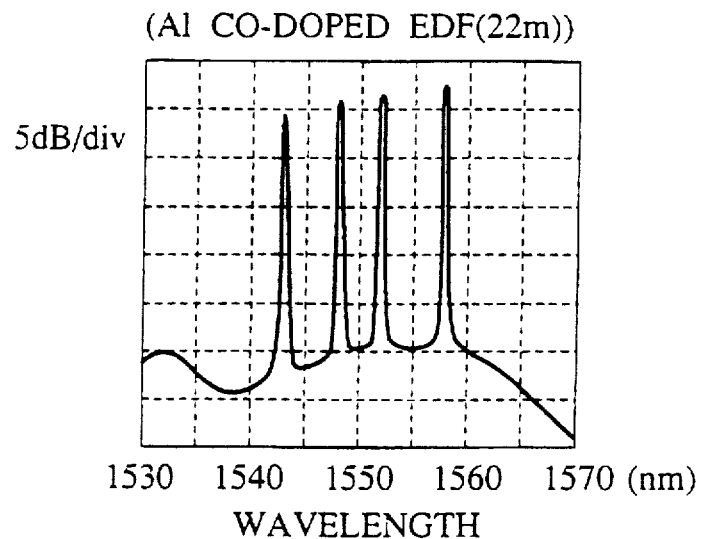
FIG. 3A is a graph illustrating an optical output spectrum of an EDF amplifier in which aluminum as well as erbium is co-doped.
Figure 3B:
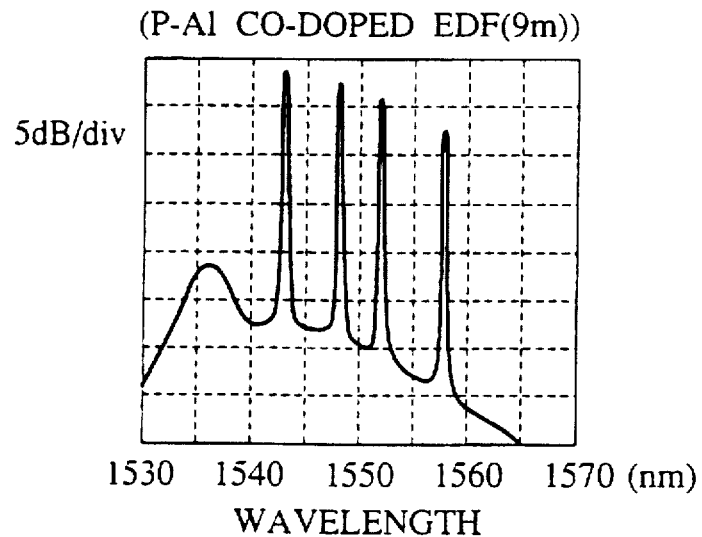
FIG. 3B is a graph illustrating an optical output spectrum of an EDF amplifier in which phosphorus and aluminum as well as erbium are co-doped.
Figure 3C:
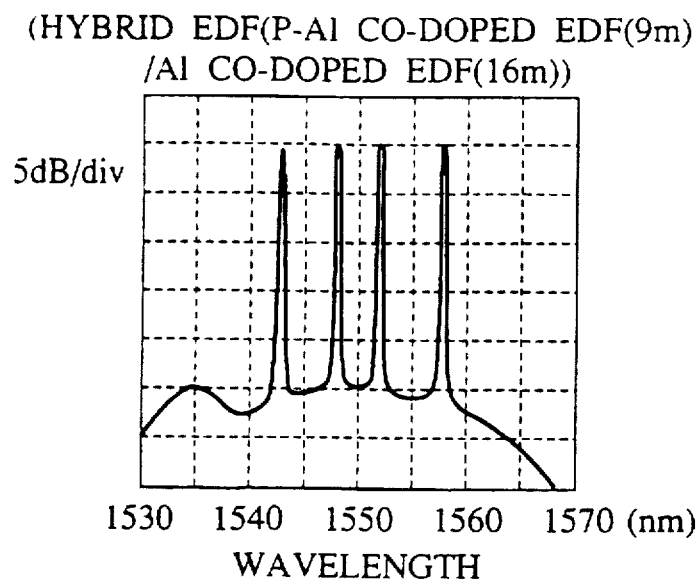
FIG. 3C is a graph illustrating an optical output spectrum of a hybrid EDF amplifier which is constructed by serially connecting the EDF amplifier in which Al as well as Er is co-doped and the EDF amplifier in which P and Al as well as Er are co-doped.
Figure 4:
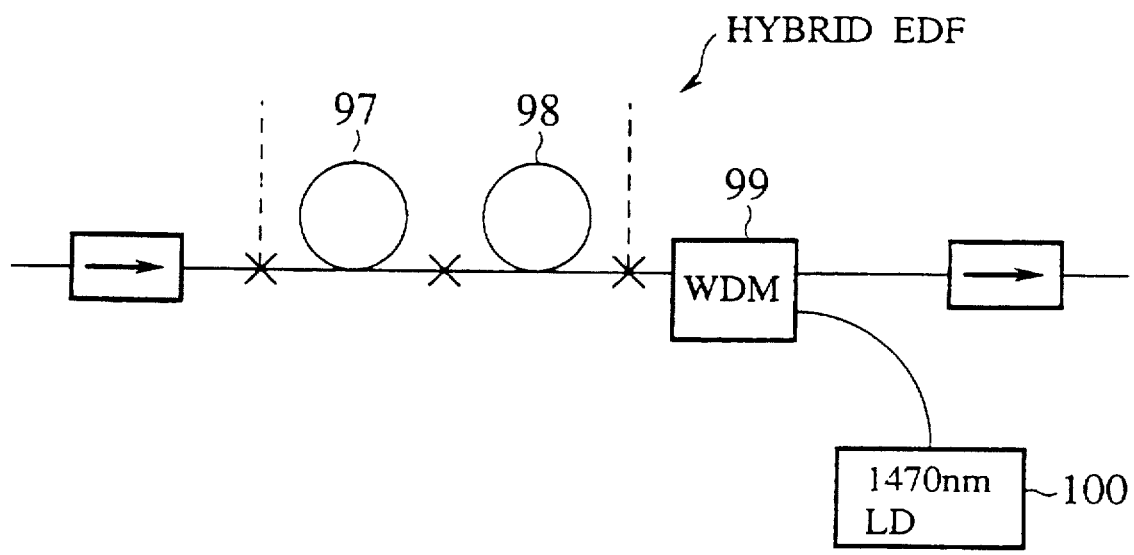
FIG. 4 is a view showing a configuration of the hybrid EDF amplifier which is constructed by serially connecting the EDF amplifier in which Al as well as Er is co-doped and the EDF amplifier in which P and Al as well as Er are co-doped.
Figure 5A:
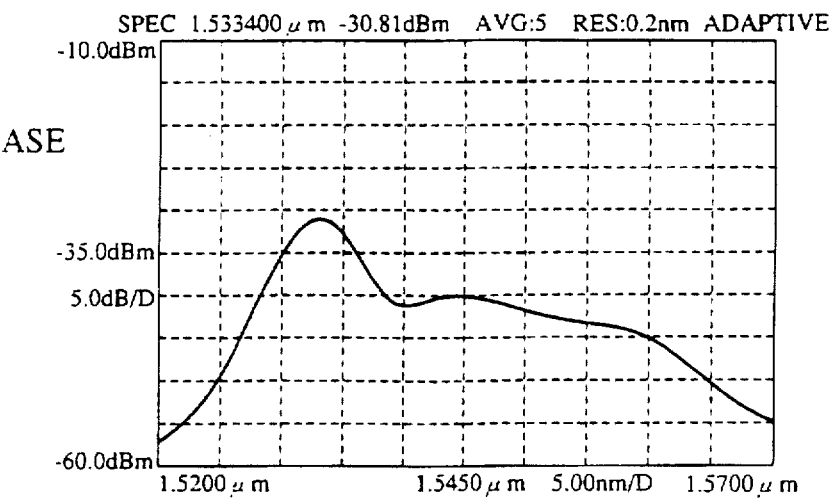
FIGS. 5A to 5C are characteristic diagrams in which ASE of a light signal supplied from the EDF amplifier in which phosphorus as well as erbium is co-doped is plotted as a function of wavelength.
Figure 5B:
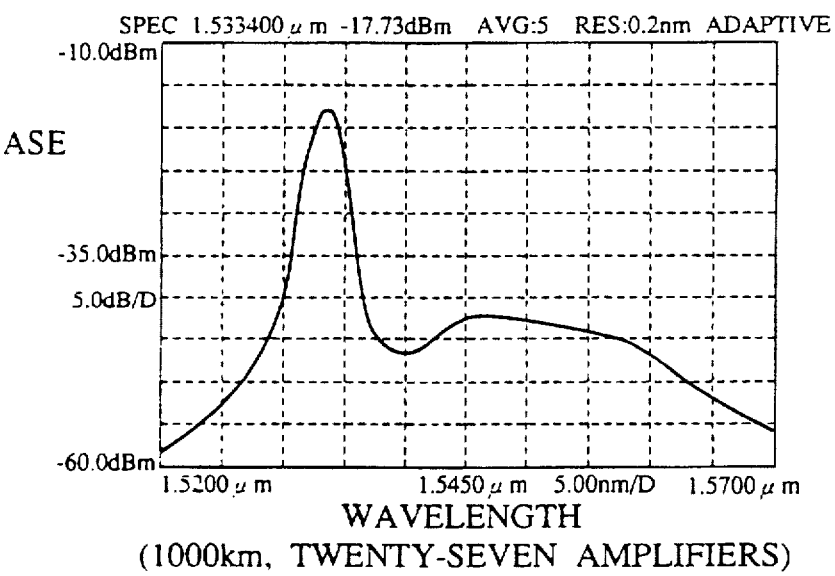
Figure 5C:
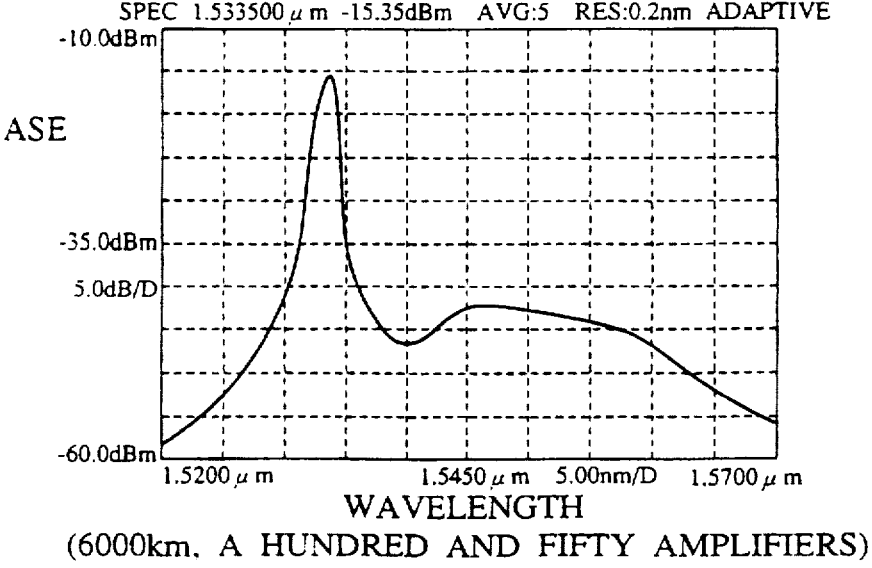
Figure 6:
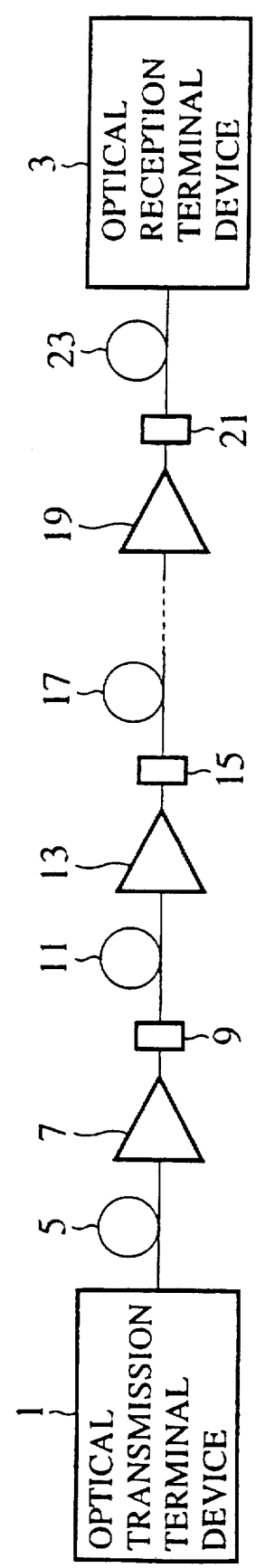
FIG. 6 is a schematic view showing a configuration of an optical transmission line according to an embodiment of the present invention.

FIG. 6 is a schematic view showing a configuration of an optical transmission line according to an embodiment of the present invention. The optical transmission line shown in FIG. 6 may be used in the 1.55 μm wavelength range, for example, in the wavelength multiplexing communication. The optical transmission line is characterized in that M-transmission optical filters having an M-character-shaped transmission characteristic are connected to output terminals of a plurality of optical amplifiers which are connected in series with optical fibers in this wavelength multiplexing communication.

More particularly, in order to connect an optical transmission terminal device 1 with an optical reception terminal device 3 in the optical transmission line shown in FIG. 6, first an optical transmission terminal device 1 is connected to an optical fiber 5 which is in turn connected to an input of a first optical amplifier 7, and an output of the first optical amplifier 7 is then connected to an optical fiber 11 via a first M-transmission optical filter 9. The optical fiber 11 is then connected to an input of a second optical amplifier 13 an output of which is in turn connected to an optical fiber 17 via a second M-transmission optical filter 15. The optical fiber 17 is then connected via a plurality of optical amplifiers and a plurality of M-transmission optical filters similarly to a last optical amplifier 19 which is in turn connected to an optical fiber 23 via a last M-transmission optical filter 21. Finally, the optical fiber 23 is connected to the optical reception terminal device 3.

Figure 9:
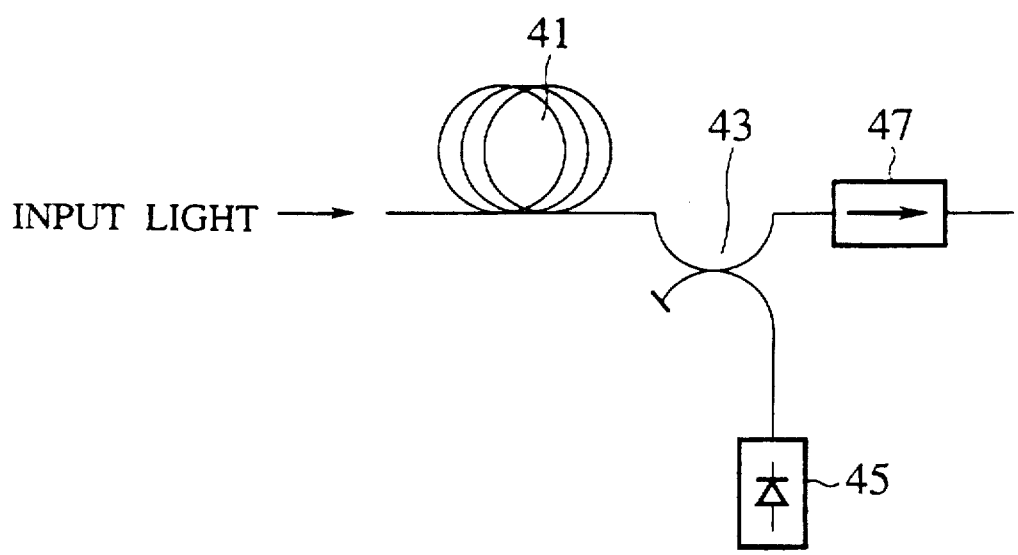
FIG. 9 is a schematic view showing a configuration of an optical amplifier used in the optical transmission line shown in FIG. 6.

A plurality of optical amplifiers 7, 13, 19 employ an erbium-doped optical fiber in which erbium (Er) is doped into the optical fiber. In an example of a configuration of the erbium-doped optical fiber, as shown in FIG. 9, a WDM (wavelength division multiplex) coupler 43 is provided on the output side of the erbium-doped optical fiber 41, and an output laser beam emitted from a pump laser diode module 45 is introduced into the erbium-doped optical fiber 41 via the WDM coupler 43 to excite it. Thereby the input optical signal can be amplified. An optical isolator 47 is provided on the output side of the WDM coupler 43 to cut off reflected lights from the output side. In the following discussion, in the case that a plurality of optical amplifiers 7, 13, 19 are to be explained, the optical amplifier 7 will be explained as a representative of them.

Figure 7A:
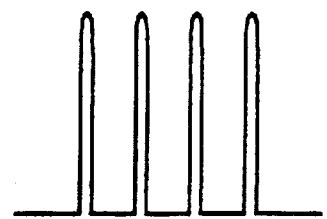
FIGS. 7A to 7E are schematic diagrammatic representation of various spectra appearing in respective sections of the optical transmission line shown in FIG. 6.
Figure 7B:
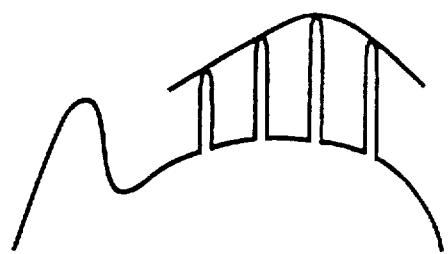

As has been described previously, the optical amplifier 7 constructed as above has uneven gain characteristic. Consequently, the optical amplifier 7 has such a characteristic that, for the purposes of example, if a wavelength multiplexed optical signal with input spectrum which has equal optical power in respective wavelengths, as shown in FIG. 7A, is input into the optical amplifier 7, the wavelength multiplexed optical signal with convexly distorted output spectrum, as shown in FIG. 7B, is output from the output of the optical amplifier 7 and at the same time ASE in the 1.53 μm wavelength range becomes increased, as shown in FIG. 7B and FIGS. 5A to 5C. As will be described later, the optical transmission line in the present embodiment intends to compensate for the uneven gain characteristic of the optical amplifier 7.

In other words, a plurality of M-transmission optical filters 9, 15, . . . , 21 are provided to compensate for the uneven gain characteristic of the optical amplifier 7 explained above. In the succeeding discussion, in the case that a plurality of M-transmission optical filters 9, 15, . . . , 21 are to be discussed, the M-transmission optical filter 9 will be explained as a representative of them.

Figure 7C:
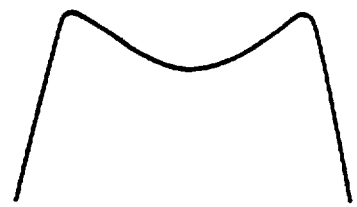

The M-transmission optical filter 9 has an inverse transmission characteristic in its central range to compensate for the uneven gain characteristic of the optical amplifier 7. If a wide wavelength range should be considered, the M-transmission optical filter 9 has the M-character-shaped transmission characteristic as shown in FIG. 7C, and, in more detail, the M-character-shaped transmission characteristic as shown in FIG. 8 so as to permit ASE in the about 1.53 μm wavelength range to be removed.

Figure 8:
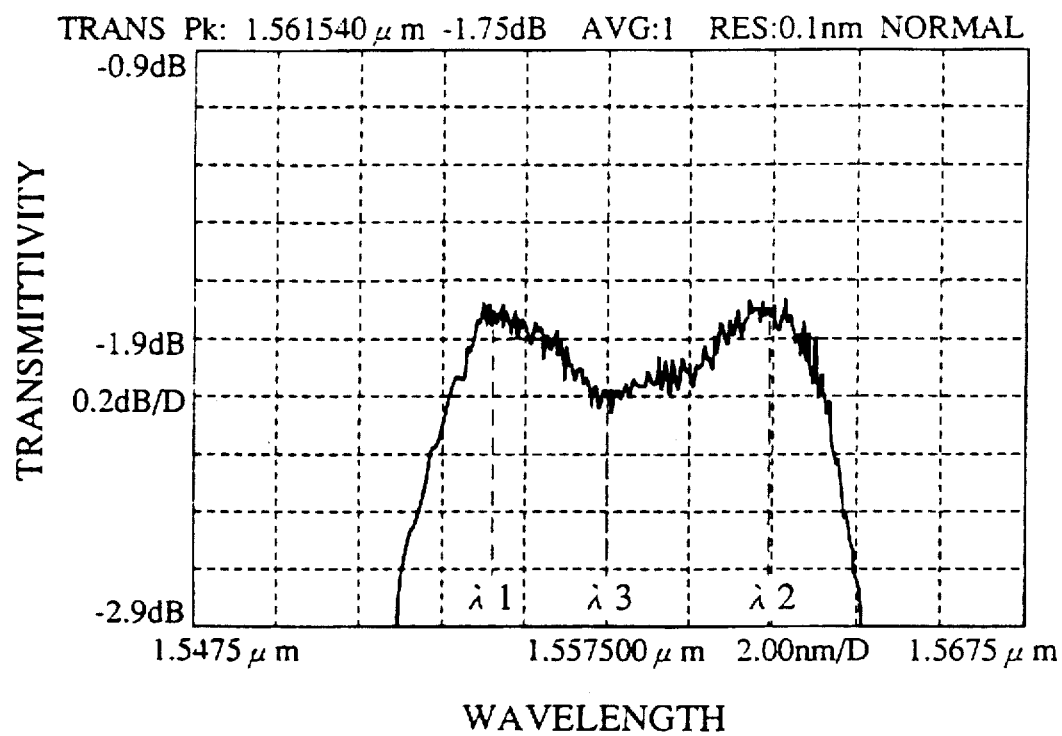
FIG. 8 is a characteristic diagram showing an M-character-shaped transmission characteristic of an M-transmission optical filter used in the optical transmission line shown in FIG. 6.

More particularly, as shown in FIG. 8, the M-transmission optical filter 9 has such a transmission characteristic that transmittivity assumes maximal values (peaks) at a first wavelength $\lambda 1$ and a second wavelength $\lambda 2$, the transmittivity decreases significantly in a wavelength range which is shorter than the first wavelength $\lambda 1$ to thereby remove ASE in the 1.53 μm wavelength range as wavelength becomes shorter, the transmittivity decreases linearly in a wavelength range which is longer than the first wavelength $\lambda 1$ and shorter than a third wavelength $\lambda 3$ located between the first wavelength $\lambda 1$ and the second wavelength $\lambda 2$ as the wavelength becomes longer, the transmittivity increases linearly in a wavelength range which is longer than the third wavelength $\lambda 3$ and shorter than the second wavelength $\lambda 2$ as the wavelength becomes longer, and the transmittivity decreases significantly in a wavelength range which is longer than the second wavelength $\lambda 2$ as the wavelength becomes longer.

Figure 7D:
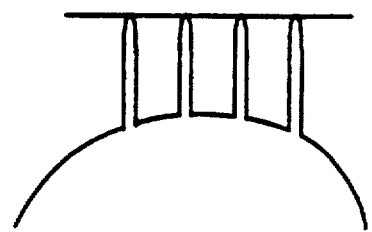

In the optical transmission line constructed as above, the wavelength multiplexed optical signal is input from the optical transmission terminal device 1 to the first optical amplifier 7 via the optical fiber 5 while having the input spectrum shown in FIG. 7A and is in turn output from the output of the first optical amplifier 7 to have an output spectrum characteristic with different signal-to-noise ratios for respective signals shown in FIG. 7B due to the uneven gain characteristic of the first optical amplifier 7. However, like the above, when the wavelength multiplexed optical signal with different signal-to-noise ratios is input into the first M-transmission optical filter 9, such characteristic of the optical signal may be canceled by the M-character-shaped transmission characteristic of the M-transmission transmission optical filter 9. As a result, the wavelength multiplexed optical signal which has a flat spectrum characteristic shown in FIG. 7D and in which ASE in the 1.53 μm wavelength range has been removed can be output and in turn input into the second optical fiber 11.

Figure 7E:
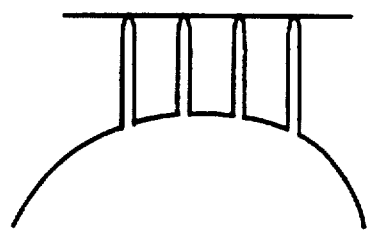

The wavelength multiplexed optical signal, if input into the second optical amplifier 13 after passing through the second optical fiber 11, has different signal-to-noise ratios for respective signals, as similarly shown in FIG. 7B. However, the optical signal with the flat spectrum characteristic can be output by compensating such ratios with the use of a second M-transmission transmission optical filter 15. Thereafter, similarly gain deviations are sequentially compensated by a series of M-transmission transmission optical filters provided after respective optical amplifiers. Finally, as shown in FIG. 7E, the normal wavelength multiplexed optical signal having the flat spectrum characteristic like the input spectrum characteristic can be transmitted to the optical reception terminal device 3 via an optical fiber 23.

In the above embodiment, the M-transmission transmission optical filters 9 have been directly connected to respective output sides of the optical amplifiers 7. However, a connection of the M-transmission transmission optical filters 9 is not limited to the above, but for instance the M-transmission transmission optical filters 9 may be provided on respective input sides of the optical amplifiers 7. Or else, one or plural M-transmission optical filters 9 may be provided to every plural optical amplifiers 7. Otherwise, the M-transmission optical filter 9 may be provided to every other optical amplifier 7, or every third optical amplifier 7, or every predetermined numbers of the optical amplifiers 7. In short the M-transmission transmission optical filters 9 may be connected arbitrarily even if the overall uneven gain characteristic of a plurality of the optical amplifiers 7 may be optimally equalized as a whole throughout the optical transmission line.

Figure 10:
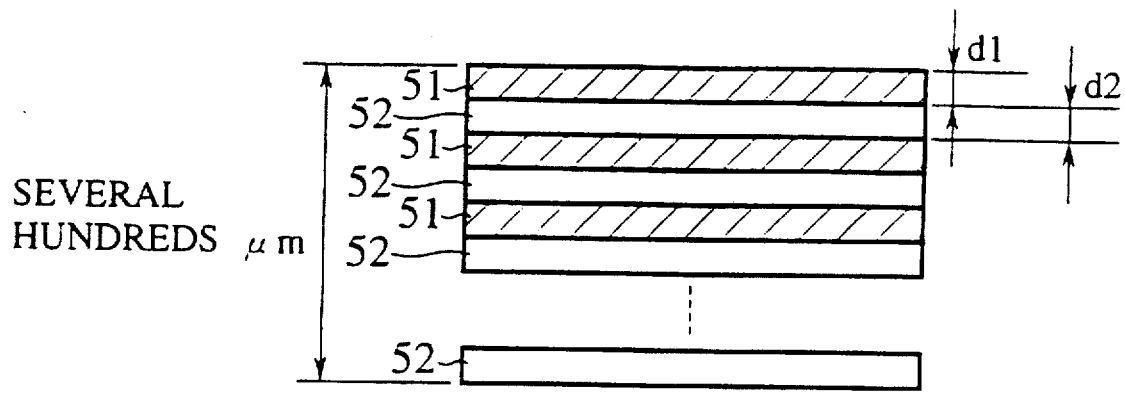
FIG. 10 is a sectional view showing a configuration of an M-transmission optical filter used in the optical transmission line shown in FIG. 6.

FIG. 10 is a sectional view showing an example of a configuration of the M-transmission optical filter 9. As shown in FIG. 10, the M-transmission optical filter 9 may be formed by stacking very thin layers of dielectric substances with different refractive index in a multistage fashion. In concrete, for example, the M-transmission optical filter 9 may be formed to have a thickness of several hundreds μm as a whole by stacking first dielectric substances 51 with first refractive index n1 and a first thickness d1 and second dielectric substances 52 with second refractive index n2 and a second thickness d2 alternatively.

The M-transmission optical filter 9 constructed as above may be constructed to have the M-character-shaped transmission characteristic, as shown in FIG. 8, if refractive indices n1, n2 and thicknesses d1, d2 of respective dielectric substances 51, 52 are optimally adjusted.

Figure 11:
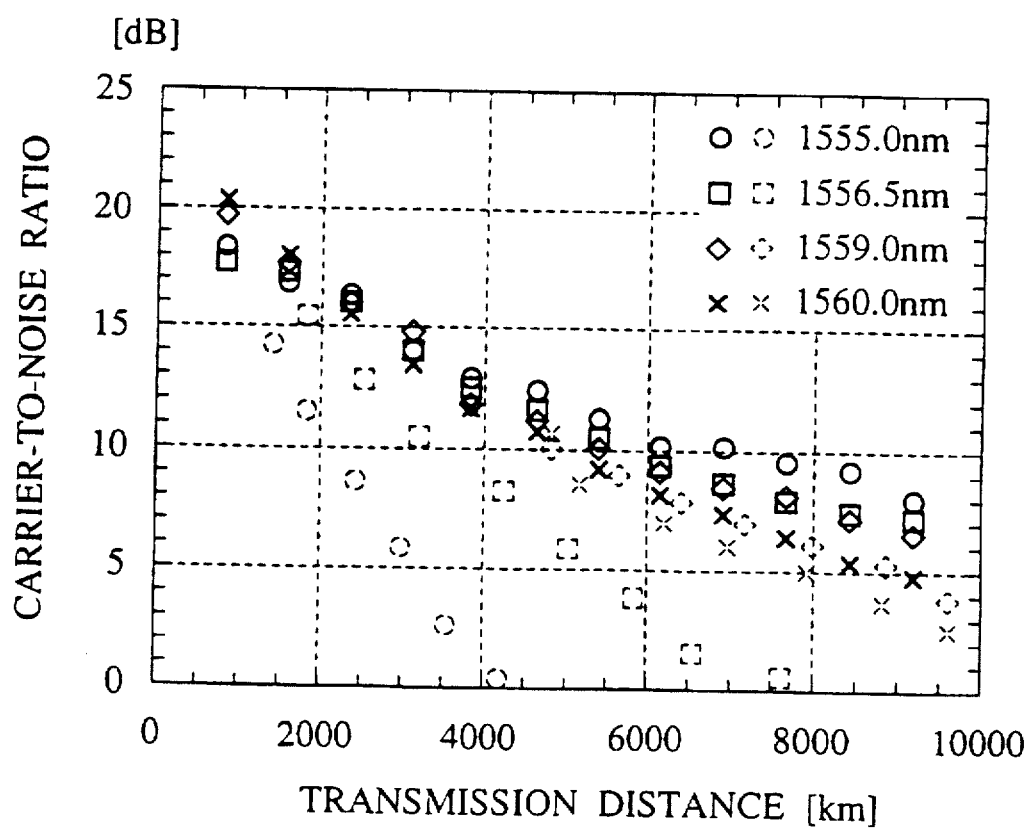
FIG. 11 is a graph showing variations in a carrier-to-noise (C/N) ratio as a function of transmission distance when light signals each having a wavelength of 1555.0 nm, 1556.5 nm, 1559.0 nm and 1560.0 nm are transmitted in conformity with a wavelength multiplexing communication system over the optical transmission line in which the M-transmission optical filters are coupled to respective outputs of the optical amplifiers one by one, like the optical transmission line shown in FIG. 6, and showing the same variations when the same light signals are transmitted over the optical transmission line in which no M-transmission optical filter is provided.

FIG. 11 is a graph showing variations in a carrier-to-noise (C/N) ratio as a function of transmission distance when light signals each having a wavelength of 1555.0 nm, 1556.5 nm, 1559.0 nm and 1560.0 nm are transmitted in conformity with a wavelength multiplexing communication system over the optical transmission line in which the M-transmission optical filters are coupled to respective outputs of the optical amplifiers one by one, like the optical transmission line shown in FIG. 6. For purposes of reference, FIG. 11 also shows the same variations when the same light signals are transmitted over the optical transmission line in which no M-transmission optical filter is coupled. In FIG. 11, round marks, square marks, rhombic marks, and X marks indicate C/N ratio characteristics in the 1555.0 nm, 1556.5 nm, 1559.0 nm and 1560.0 nm wavelength range respectively. Marks shown by the solid line indicate C/N ratio characteristics of the optical transmission lines of the present invention in case the M-transmission optical filters 9 are connected to the outputs of the optical amplifiers 7 one by one. Marks shown by the dotted line indicate C/N ratio characteristics of the optical transmission lines in the prior art in case no M-transmission optical filter 9 is provided.

As can be seen from the C/N characteristics shown in FIG. 11, in the optical transmission lines of the present invention indicated by respective marks of the solid line, deviations of carrier-to-noise (C/N) ratios of respective optical signals can be suppressed less than about 3 dB even after the signals have been transmitted by a distance of 9000 km. On the contrary, in the optical transmission lines in the prior art without the M-transmission optical filter 9, deviations of carrier-to-noise (C/N) ratios of respective optical signals have been increased with the increase of the transmission distance.

Figure 12:
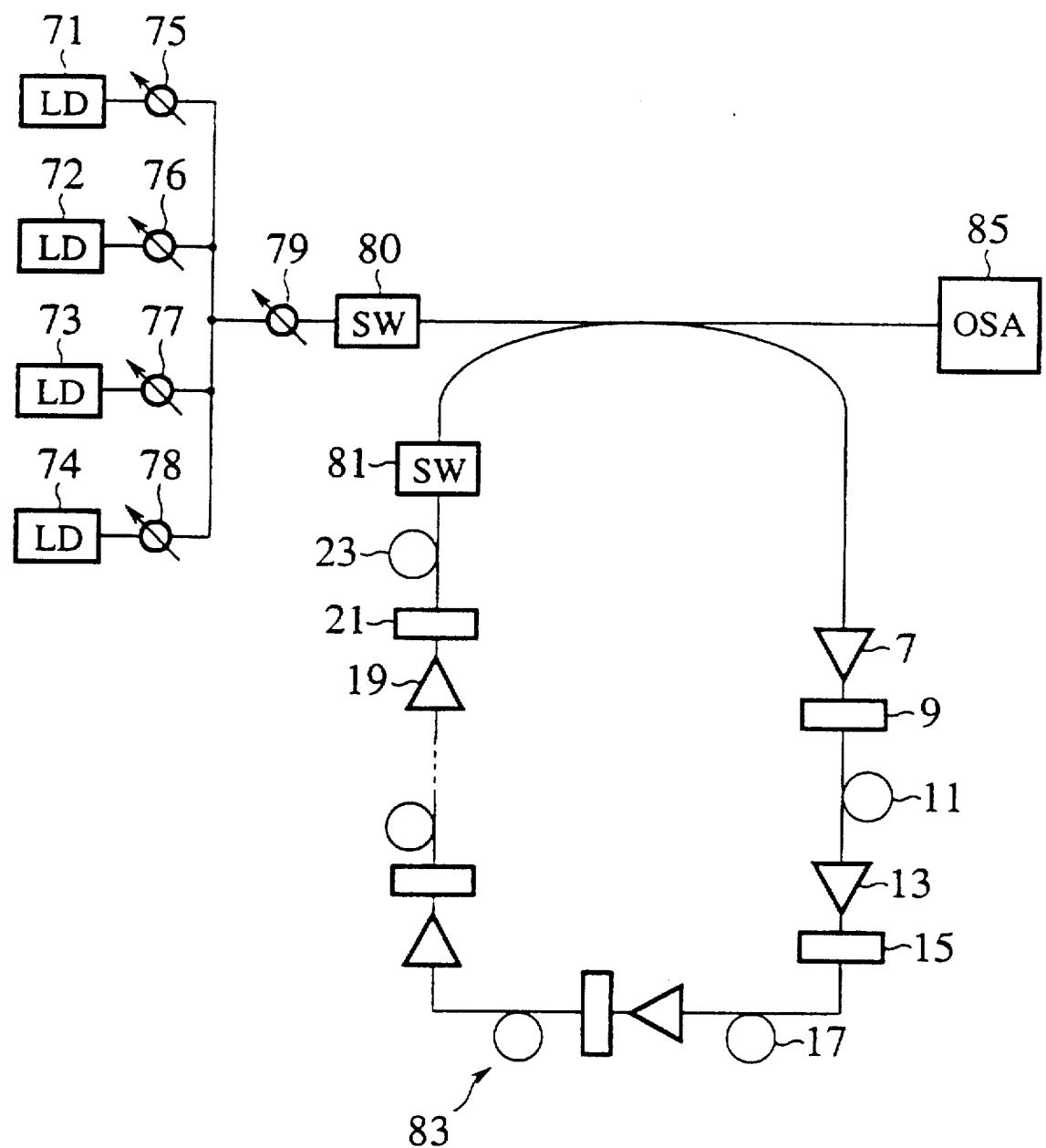
FIG. 12 is a view showing a configuration of an experimental circuit used to measure the variations shown in FIG. 11.

Variation characteristics in carrier-to-noise (C/N) ratios indicated by the solid line in FIG. 11 in the present invention have been measured by making use of an experimental circuit shown in FIG. 12. But variation characteristics indicated by the dotted line in FIG. 11 in the prior art show estimated values based on the similar experiment.

Referring to FIG. 12, the experimental circuit will be explained hereinbelow when variation characteristics in carrier-to-noise (C/N) ratios indicated by the solid line in FIG. 11 in the present invention are measured.

The experimental circuit shown in FIG. 12 comprises four laser diodes (LDs) 71 to 74 for generating light signals having above four wavelengths of 1555.0 nm, 1556.5 nm, 1559.0 nm and 1560.0 nm respectively, attenuators 75 to 78 for adjusting magnitude of the outputs of the laser diodes 71 to 74 respectively, an attenuator 79 for adjusting magnitude of the output signals of the laser diodes 71 to 74 as a whole, a first switch 80 for transmitting four wavelength multiplexed optical signals output from the attenuator 79 onto the optical transmission line, an optical transmission line 83 connected to the first switch 80 to form a loop-like shape and having ten optical amplifiers 7, 13, . . . , 19 and ten M-transmission optical filters 9, 15, . . . , 21 which are connected in series with each other via optical fibers 11, 17, . . . , 23 respectively, an optical spectrum analyzer (OSA) 85 for measuring the wavelength multiplexed optical signals after they have been transmitted over the optical transmission line.

In the experimental circuit constructed as above, the optical signals of above four wavelength are generated from respective laser diodes 71 to 74 and in turn wavelength-multiplexed by adjusting optical power in respective wavelengths via respective attenuators. Then, the wavelength-multiplexed optical signal is first introduced into the loop optical transmission line 83 under the condition that the first switch 80 is turned on and the second switch 81 is turned off. Next, the first switch 80 is turned off and the second switch 81 is turned on, so that the optical signal is circulated required times through the optical transmission line 83 to be transmitted by a predetermined distance. The optical spectrum analyzer 85 is caused to start sweeping just when the optical signal has been circulated by the predetermined distance. Hence, the optical spectrum analyzer (OSA) 85 can measure the wavelength multiplexed optical signal at that time. In this measurement, the carrier-to-noise (C/N) ratios which are measured while varying the transmission distance achieved by circulation through the optical transmission line 83 are the characteristics shown in FIG. 11.

Figure 13A:
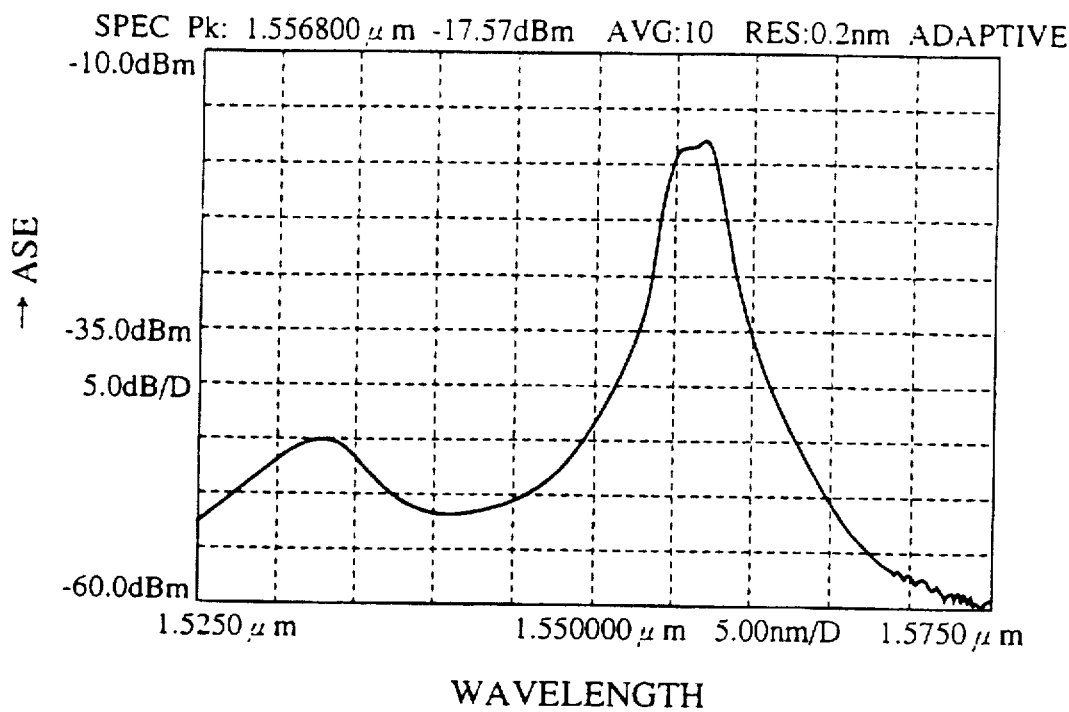
FIG. 13A is a graph showing ASE spectrum as a function of wavelength after the light signal has been transmitted by a distance of 8800 km over the optical transmission line if respective M-transmission optical filters in the embodiment shown in FIG. 6 are connected after respective optical amplifiers.
Figure 13B:
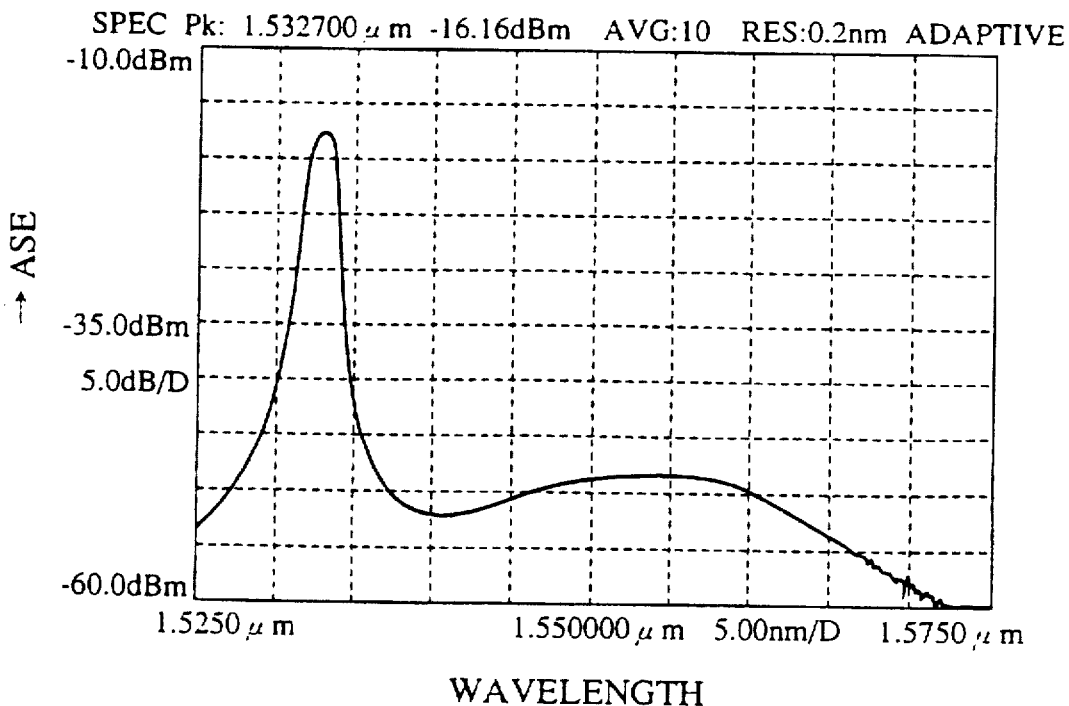
FIG. 13B is a graph showing ASE spectrum as a function of wavelength after the light signal has been transmitted by a distance of 8800 km over the optical transmission line if no M-transmission optical filter in the embodiment shown in FIG. 6 is connected after respective optical amplifiers.

FIGS. 13A and 13B are graphs showing ASE spectra as a function of wavelength after the light signal has been transmitted by a distance of 8800 km over the optical transmission line 83 in the event that respective M-transmission optical filters in the present embodiment are connected after respective optical amplifiers and no M-transmission optical filter is connected respectively. As shown in FIG. 13A, it can be understood that, in case the M-transmission optical filters are connected, ASE in the 1.53 μm wavelength range has been able to be suppressed completely and in addition ASE in the 1.55 μm wavelength range, i.e., gain, has been able to be enhanced. In contrast, as shown in FIG. 13B, it is evident that, in case no M-transmission optical filter is connected, ASE in the 1.53 μm wavelength range has been increased and gain in the 1.55 μm wavelength range has been small.

As discussed above, according to the embodiment of the present invention, since the M-transmission optical filters having the M-character-shaped transmission characteristic are connected in series with the optical amplifiers to compensate for gain characteristic of the optical amplifiers, gain of the optical amplifiers can be optimally equalized by making use of a relatively simple configuration. Still further, particularly ASE in the wavelength range of 1.53 μm can be removed and gain in the wavelength range of 1.55 μm can be increased.

In addition, in order to optimally equalize the overall gain of a plurality of optical amplifiers, each of said M-transmission optical filters is provided to every optical amplifier or to every predetermined numbers (>1) of said plurality of optical amplifiers. As a result, the optical transmission line can be constructed with flexibility.

Further, since the M-transmission optical filters have such a transmission characteristic that transmittivity assumes maximal values (peaks) at the first wavelength and the second wavelength and also transmittivity decreases significantly in the wavelength range which is shorter than the first wavelength as wavelength becomes shorter, unevenness of gain of the optical amplifier can be precisely compensated and ASE in the 1.53 μm wavelength range can also surely be removed.

Furthermore, since the M-transmission optical filters have the inverse transmission characteristic in its central range to compensate for the gain characteristic of the optical amplifier with the erbium-doped optical fiber in the 1.55 μm wavelength range, gain of the wavelength multiplexed signal in respective wavelengths can be optimally equalized and ASE in the 1.53 μm wavelength range can also be removed.

It should be understood that many modifications and adaptations of the invention will become apparent to those skilled in the art and it is intended to encompass such obvious modifications and changes in the scope of the claims appended hereto.

What is claimed is:

1. An optical transmission line in which a plurality of optical amplifiers are connected in series with optical fibers at a predetermined distance to amplify wavelength multiplexed optical signals transmitted over said optical fibers in conformity with a wavelength multiplexing communication system, said optical transmission line comprising:

M-transmission optical filters which are connected in series with said plurality of optical amplifiers and have an M-character-shaped transmission characteristic to compensate for unevenness of gain of said plurality of optical amplifiers; and wherein dependence of an overall gain of said plurality of optical amplifiers on wavelength is optimally equalized.

2. An optical transmission line according to claim 1, wherein said M-transmission optical filters have such a transmission characteristic that transmittivity assumes maximal values at a first wavelength and a second wavelength, said transmittivity decreases significantly in a wavelength range which is shorter than said first wavelength as wavelength becomes shorter, said transmittivity decreases linearly in a wavelength range which is longer than said first wavelength and shorter than a third wavelength located between said first wavelength and said second wavelength as said wavelength becomes longer, said transmittivity increases linearly in a wavelength range which is longer than said third wavelength and shorter than said second wavelength as said wavelength becomes longer, and said transmittivity decreases significantly in a wavelength range which is longer than said second wavelength as said wavelength becomes longer.

3. An optical transmission line according to claim 1, wherein said plurality of optical amplifiers are erbium-doped optical fiber amplifiers in a wavelength range of 1.55 μm, and said M-transmission optical filters have an inverse transmission characteristic in a central range to compensate for gain characteristic of said plurality of optical amplifiers and have transmission characteristics capable of removing amplified spontaneous emission (ASE) in a wavelength range of about 1.53 μm.

4. An optical transmission line according to claim 1, wherein each of said plurality of optical amplifiers or each group having at least two optical amplifiers connected in series has one M-transmission optical filter connected thereafter.

\* \* \* \* \*